United States Patent [19]

Buchanan et al.

[11] Patent Number: 5,391,320
[45] Date of Patent: Feb. 21, 1995

[54] TERBIUM ACTIVATED SILICATE LUMINESCENT GLASSES

[75] Inventors: Robert A. Buchanan, Palo Alto; Clifford Bueno, Sunnyvale, both of Calif.

[73] Assignee: Lockheed Missiles & Space Company, Inc., Santa Clara, Calif.

[21] Appl. No.: 719,445

[22] Filed: Jun. 24, 1991

Related U.S. Application Data

[63] Continuation-in-part of Ser. No. 398,873, Aug. 28, 1989, abandoned.

[51] Int. Cl.$^6$ .............................................. C09K 11/79
[52] U.S. Cl. ................... 252/301.4 F; 501/64; 501/73
[58] Field of Search .................. 252/301.4 F; 501/64, 501/73

[56] References Cited

U.S. PATENT DOCUMENTS 3,527,711 9/1970 Barber et al. ............... 252/301.4 F
4,798,681 1/1989 Oversluizen et al. ......... 252/301.4 F Primary Examiner—Jack Cooper

[57] ABSTRACT

This invention relates to terbium activated silicate luminescent glasses exhibiting reduced afterglow and enhanced luminescence due to incorporation therein of selected rare earth oxides of cerium, europium and gadolinium.

7 Claims, 1 Drawing Sheet

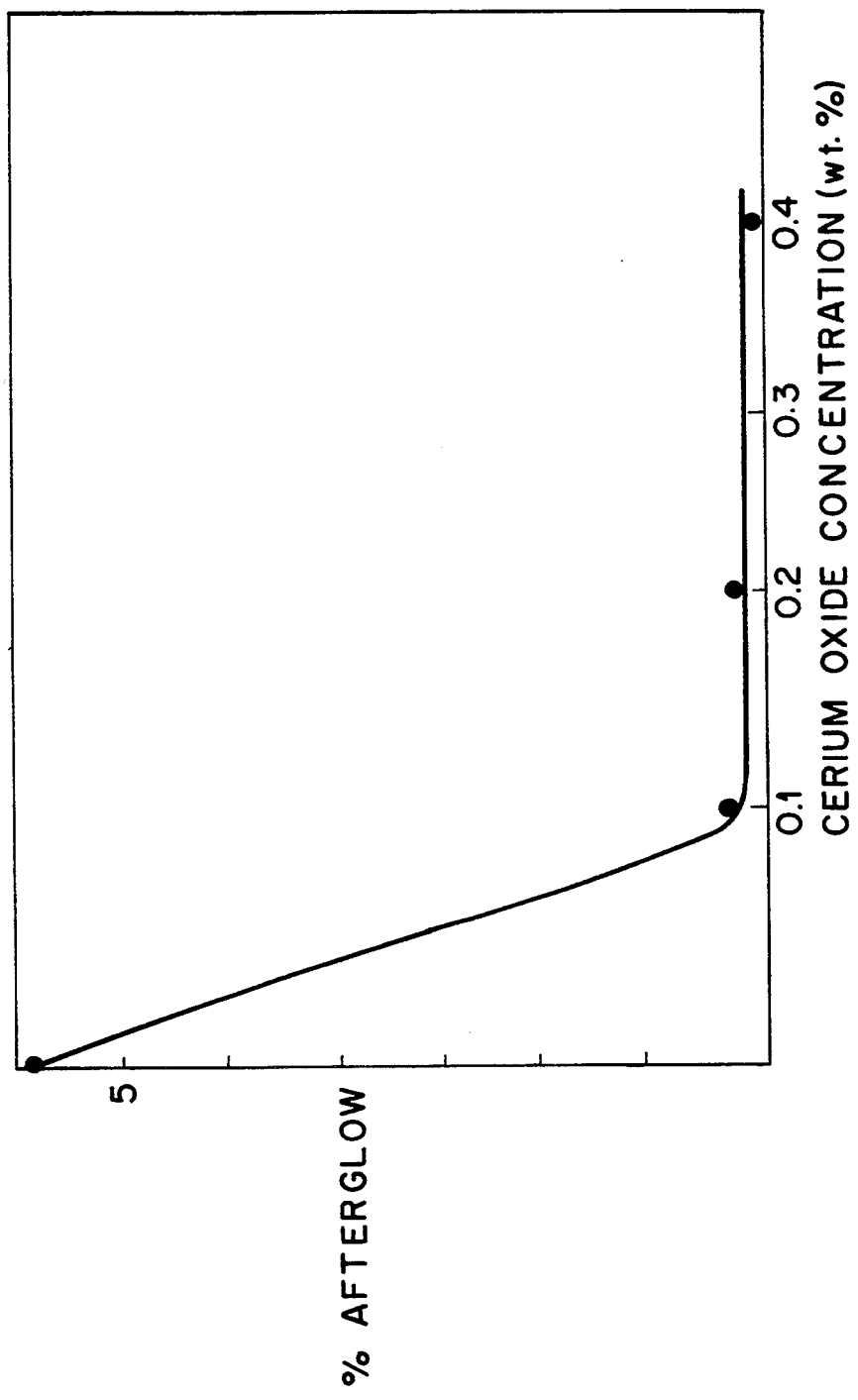

TERBIUM ACTIVATED SILICATE LUMINESCENT GLASSES

This patent application is a continuation-in-part application of patent application Ser. No. 398,873, filed Aug. 28, 1989, now abandoned.

TECHNICAL FIELD

This invention relates to terbium activated silicate luminescent glasses exhibiting reduced afterglow and an enhanced luminescence responsivity under x-rays in the range of from about 5 keV to about 16 MeV.

BACKGROUND ART

Materials that convert x-ray energy into visible light are useful for detection and imaging purposes. Materials that are exceptionally efficient at this conversion or that give higher resolution images and exhibit reduced afterglow are preferred. The glass material of the present invention is specifically intended for converting x-ray electromagnetic energy into visible electromagnetic energy for the purpose of detecting and imaging these radiations.

A method for using luminescent glass is to view the emission in real time employing a video camera. Important characteristics of the glass in this mode include high absorption of the excitation radiation, high luminescence responsivity, prompt emission, low afterglow, and a linear response over a wide range of excitation intensity. The luminescent glass must also emit light within the wavelength sensitivity range of the recording camera and maintain the spatial resolution of the primary image. Particular applications for the glass in this mode include detecting x-rays, or gamma rays for the purpose of diagnostic medical or industrial imaging (see, for example, Bossi, R. H., Oien, C. T., "Real-Time Radiography" RPT #DE82-005603, UCRL-53091, LLNL, CA) or for tracking high energy particles (see, for example, Ruchti, R. et al, "Scintillating Glass, Fiber Optic Plate Imaging System for Tracking Applications in High Energy Physics Experiments", *J. Luminescence* Vol. 31–32, Part 1 and 2, December 1984, Proceedings of the 1984 International Conference on Luminescence, Madison, Wis., USA, Aug. 13–17, 1984 p. 721–723).

Luminescent glasses that are transmissive to light from the near ultraviolet (200–300 nm) to the near infrared (3000 nm) and that can be formed into clear glass plates and fibers (see R. F. Reade, U.S. Pat. No. 3,654,172), lenses (see T. Takahashi, et al, U.S. Pat. No. 4,259,587), or ground glass are used to detect various forms of electromagnetic, electron beam, particle beam or nuclear radiation by luminescing under the proper excitation conditions. The threshold for luminescence in glass as in other inorganic luminescent materials is typically above an excitation energy of approximately 2.5 eV (see, for example, Blasse, G. and Bril, A. "Characteristic Luminescence," *Philips Technical Review*, Vol. 31, No. 10, 304, 1970).

Luminescent glasses are of particular interest in real time x-ray radiography. Traditionally, in real time x-ray radiography, a visible image is generated by a polycrystalline x-ray-to-light conversion screen that is monitored by a low light level TV camera. A similar screen can also be employed in an x-ray image amplifier tube where the visible image generated by the phosphor is further electro-optically intensified prior to collection by a TV camera. Other types of x-ray screens are typically composed of polycrystalline x-ray phosphor particles embedded in a binder, and both are supported on a thin mylar sheet as taught by Buchanan, R. A. et al, U.S. Pat. No. 3,725,704. Although many commercial polycrystalline phosphor screens have a strong luminescence signal under x-rays (as illustrated by Buchanan, R. A., et al in U.S. Pat. No. 4,297,584), the image resolution is limited by the light scatter among individual phosphor particles in the screen and the image contrast can be limited by their relatively low x-ray absorption efficiencies. Furthermore, light scatter in thicker, more absorbing screens will trap the light embedded in the sublayers of the screen to result in a reduced light signal and therefore a reduced contrast perceptibility. The binder in the screen, which can be present in as much as 50 percent by weight has the added disadvantage of being inert and provides no means for transferring energy absorbed within to luminescent centers in the crystalline phosphor particles. These same problems exist when these phosphor screens are used as film intensifier screens in radiographic film cassettes.

Luminescent glass plates and fiber optic scintillating plates offer solutions to the problems imposed by polycrystalline phosphor screens. Such glass plates do not degrade resolution by transverse light scattering within the glass. Secondly, increased x-ray absorption and improved noise statistics can be realized by the use of thicker ($\frac{1}{4}$") glass plates where light from the entire cross-section of the plate can reach the recording medium without being trapped or scattered. Thirdly, no binder is required, and theoretically all the x-ray energy absorbed can be transferred to the luminescent centers in the glass. Finally, luminescent glass plates are more resistant to environmental attack, for example, scratches, chemical reaction, and abrasion.

The advantage of using thick glass plates is particularly important for industrial radiography where high energy x-rays (100keV–16MeV) are used and where the thick glass plates will absorb and convert a higher portion of the photon flux than the more x-ray transparent thin polycrystalline phosphor screens. Illustrative uses for high energy luminescent glasses include a stand alone luminescent glass plate viewed by a low level TV camera forming a real time radiographic system, a fiber optic scintillating plate incorporated in an x-ray image amplifying fluoroscopy tube, a fiber optic scintillating plate for intensification of film in a radiographic film cassette and a fiber optic scintillating plate in direct contact with a CCD in a CCD camera in a solid state x-ray imaging system.

Although luminescent glass detection screens have shown promise for x-ray radiographic application (U.S. Pat. No. 3,654,172), they haven't been widely used because of phosphorescence problems including signal instability (i.e., background buildup), afterglow and low luminescence responsivity. Those that have been used are activated with terbium oxide, but suffer from these drawbacks.

The effects of phosphorescence, afterglow and background buildup are believed to be caused by radiation produced free electrons and holes that are trapped in defect centers in the glass structure. Such defect centers can consist of vacancies, interstitial atoms or other types of charge imbalance. Over time, these trapped carriers are released by thermal and electromagnetic (i.e., x-rays) stimulation, and radiatively recombine at luminescence centers to result in phosphorescence. In real time systems, the buildup of the background is a result of the gradual filling of traps. With increasing illumination, intensity or duration, deeper and deeper traps become filled, and eventually emptied and hence the long decay component is increased and the background level increases. If the background levels are significant, this could lead to increased noise and image lag. The problem becomes apparent in making observations of very weak signals following very strong signals. This problem is not limited to luminescent glasses but has also arisen with some polycrystalline phosphor materials in real time imaging systems (see, for example, Torr, M. R. "Persistence of Phosphor Glow in Microchannel Plate Image Intensifiers," *Applied 5 Optics* Vol. 24, No. 6, 793, 1985).

Prior terbium activated silicate luminescent glasses used in x-ray applications, including those developed under U.S. Pat. No. 3,654,172, have a strong phosphorescence after only moderate exposures to x-rays. Applicants have found that this phosphorescence is manifested as a signal increase of as much as 130% after 3000 R and 180% after 25,000 R of its initial value under continuous illumination at 250 kVp.

The prior art also contains many examples of terbium activated silicate luminescent glass developed for use in lamps, where the luminescent material is used to transform ultraviolet (UV) electromagnetic radiation into visible electromagnetic radiation. While these materials are similar to those of the present invention in that they are both terbium activated silicate glass materials, these materials, however, have high afterglow and trapping of x-ray energy under x-ray excitation. Furthermore, these materials do not contain the high Z components needed for x-ray absorption and would need to be excessively thick to absorb the appropriate levels of radiation. X-ray absorption in materials increases by $Z^3$ in the diagnostic x-ray energy regime. Increasing the effective Z of the glass will therefore have a substantial impact on its x-ray absorption efficiency and therefore the signal-to-noise of the resulting image. Conversely, higher Z materials will allow thinner plates to be obtained for a given x-ray absorption efficiency. Thinner x-ray screens of a given class of luminescent materials always provides improved spatial resolution. Examples of luminescent glass materials that are activated by trivalent terbium but are poor x-ray materials because of high afterglow and low x-ray absorption efficiency are those developed by (1) Popma, et al, U.S. Pat. No. 4,751,148, (2) Santoku Met Ind KK, 12.09.73-JA-102141 (09.05.75) CO3b DO3d, (3) Oversluizen, et al, U.S. Pat. Nos. 4,798,681 and 4,798,768, and (4) Barber, et al, U.S. Pat. No. 3,527,711.

These materials developed for UV lamp applications have a different composition, and have a different physical operating behavior from those materials of the present invention. The UV excitation process is understood in terms of the UV excitation energy interacting directly with the emitting activator ion, whereas in the x-ray case the excitation energy interacts with the host materials producing electrons and holes which then interact with the emitting activator ion. In the x-ray excitation process there is opportunity for the electrons and holes to become temporarily trapped in the host material before transmitting their energy to the activator ion. This trapping effect results in unwanted afterglow and persistence in the emitted radiation. This afterglow is detrimental to the x-ray uses of these materials. It is recognized in the art that a good material for use in lamps is not indicative of the material's performance in x-ray screens and one cannot depend on the known properties of UV-excited lamp materials as a guide to x-ray performance.

While the prior art teaches many compositions that are useful for UV lamps and cathode-ray tube applications, the prior art does not give any guidance for reducing phosphorescence, buildup or afterglow in these materials while retaining or improving luminescence responsivity under x-rays.

Another aspect limiting the use of existing luminescent glasses for x-ray imaging applications is their low luminescence efficiency (gram for gram) compared to polycrystalline phosphor materials. The known prior art luminescent glass host materials allow only a low level of terbium activation before the onset of concentration quenching (where increased levels of activator do not increase light output and can reduce responsivity by increasing the probability of trapping in the glass). There exists a need for new host materials permitting increased levels of terbium oxide before the onset of concentration quenching with a resulting improvement in light output.

DISCLOSURE OF INVENTION

Briefly, in accordance with the invention, selected rare earth oxides are incorporated into terbium activated silicate luminescent glasses, including certain compositions of U.S. Pat. No. 3,654,172, to reduce phosphorescence and background buildup and enhance luminescent responsivity under x-ray illumination energy between about 5 keV and 16 MeV.

More particularly, in one embodiment of the invention, the silicate glasses contain, by weight on the oxide basis, 35 to 56.1 percent silicon oxide; about 0.1 to 2 percent of at least one oxide selected from the group consisting of cerium oxide and europium oxide, preferably about 0.1 to 1.0 percent; 0.75 to 20 percent terbium oxide, preferably 6 to 12 percent; and 1 to 15 percent gadolinium oxide, preferably 1 to 10 percent.

In another embodiment of the invention, the silicate glasses consist essentially by weight on the oxide basis of about 3–25% $R_2O$ wherein $R_2O$ consists of 0–5% $Li_2O$, 0–25% $Na_2O$, 0–25% $Na_2O$, 0–25% $K_2O$, 0–25% $Rb_2O$ and 0–25% $Cs_2O$; 5–55% RO wherein RO consists of 0–20% MgO, 0–30% CaO, 0–45% SrO and 0–55% BaO; 35–56.1% $SiO_2$; 0–20% $R_2O_3$ wherein $R_2O_3$ consists of 0–20% $La_2O_3$ and 0–15% $Y_2O_3$; 0.1–2% of at least one oxide selected from the group consisting of cerium oxide and europium oxide; 0.75–20% $Tb_2O_3$ and 1–15% $Gd_2O_3$.

The composition in the prior art considered the closest to that of the present invention is that of Oversluizen, et al, U.S. Pat. No. 4,798,681. The following Table 1 compares the Oversluizen composition with that of claim 1 of the present application.

TABLE 1

| | (mol %) PRESENT INVENTION | OVERSLUIZEN, et al |
|---|---|---|
| $SiO_2$ | 57 to 86.1 | 75.6 to 99 |
| Metal Oxides (MO)* | 13.72 to 35.33 | 0 to 11.3 |
| $Tb_2O_3$ and/or $Ce_2O_3$ | — | 1 to 13.1 |
| $Tb_2O_3$ | 0.15 to 6.9 | — |
| Cerium Oxide or Europium Oxide | 0.02 to 0.77 | — |

*MO groups all other metal oxides (including $Gd_2O_3$) present in the glass, excluding europium oxide Clearly, Oversluizen's inventive concept deals with luminescent quartz glasses having high conversion efficiencies and notably high quantum efficiencies upon excitation by UV radiation (U.S. Pat. No. 4,798,681, Col 2, lines 10–13). In distinct contrast, the present inventive concept deals with terbium activated silicate luminescent glasses exhibiting reduced afterglow and an enhanced luminescence responsivity under x-rays in the range of from about 5 keV to about 16 MeV. In addition to this difference in inventive concept, the invention's maximum $SiO_2$ concentration is limited to 56.1 weight percent (86.1 mole percent) which, as seen in Table 1, causes the MO contents of the two compositions to be clearly distinguishable. In the present invention the maximum $SiO_2$ content permits more of the high Z metal oxide components to be included which directly benefits the performance of the x-ray glass. Values for $SiO_2$ much higher than 86.1 mol percent are unimportant for x-ray applications in that the glass plate would have to be made very thick to absorb a substantial portion of the x-ray flux in view of the lower amount of MO permitted in the composition.

A further difference between Oversluizen and the present invention results from the differing inventive concepts in that the present invention requires the inclusion of terbium oxide and either cerium oxide or europium oxide. In contrast, Oversluizen states, Col 2, lines 45–46, that useful absorption of exciting radiation is effected in the activators Tb and/or Ce. Clearly, either ion may be utilized alone without the other ion. Applicants' cerium or europium addition reduces afterglow, phosphorescence and signal buildup and is not intended to be a primary activator. The addition of cerium alone results in very dim emission under x-rays. The addition of terbium alone results in a glass having a very undesirable afterglow for x-ray applications. Addition of cerium above Applicants' limit given in Table 1 has the effect of reducing x-ray luminescence output even in the presence of terbium oxide. Such higher levels continue to reduce trapping and afterglow caused by the ionizing radiation, but the light output decrease under x-rays associated with the additions is prohibitively high. The light output decreases with increasing cerium (see Example 1 of this application). Europium additions to applicants' composition reduce afterglow, phosphorescence and signal buildup and is not intended to be a primary activator (see Table 3 of this application). On the other hand, Oversluizen states that europium is added to shift the luminescence to a red emission. There is no evidence of this red emission occurring in applicants' glass composition under x-rays.

Oversluizen states that all metal oxides are equivalent to gadolinium oxide and that $Gd_2O_3$ may be omitted from the composition. Applicants' glass compositions require $Gd_2O_3$ to improve the luminescence output of the glass.

Popma, et al, U.S. Pat. No. 4,751,148 discloses a terbium activated silicate glass for use in lamps and cathode-ray tubes. Popma teaches that at least one activator selected from the group consisting of terbium and cerium is included in the composition. Clearly, either ion may be utilized alone without the other ion. This is in distinct contrast to applicants' claimed invention which requires the inclusion of both ions. Applicants' cerium addition reduces afterglow, phosphorescence or signal buildup and is not intended to be a primary activator. Furthermore, the addition of cerium alone results in a very dim emission under x-rays. The addition of terbium alone results in a glass having a very undesirable afterglow under x-ray excitation. The composition disclosed by Popma can be easily distinguished from the material of the present invention because the Popma material does not utilize gadolinium, and does not require that both terbium and cerium or europium be present at the same time.

Santoku (Santoku Met Ind KK, 12.09.73-JA-102141) teaches the use of a series of different rare-earth activators for the purpose of obtaining glass fibers that fluoresce with different emission spectra when excited under ultraviolet light. He states that all such rare earths can be added together or alone. This reference is accordingly deficient in rendering applicants' invention obvious for the reasons discussed in conjunction with Popma. The composition disclosed by Santoku can be easily distinguished from the material of the present invention because the Santoku material does not utilize gadolinium, and does not require that both terbium and cerium or europium be present at the same time.

Barber, et al (U.S. Pat. No. 3,527,711) discloses a terbium activated silicate glass. Barber, et al teaches that the upper limit of terbium and gadolinium is 0.25%. The Barber material is clearly distinguishable from materials of the present invention which has terbium and gadolinium concentrations considerably larger than those taught by Barber.

BRIEF DESCRIPTION OF THE DRAWING

The invention may be more easily understood from the following description and accompanying drawing which, on coordinates of percent afterglow and cerium oxide concentration in weight percent, is a plot showing the effect of cerium inclusions on the afterglow of a terbium activated silicate glass of the invention. The sample was irradiated with 15 kR and the afterglow measured 0.5 seconds later.

BEST MODE OF CARRYING OUT THE INVENTION

Applicants have found that cerium oxide additions or europium oxide additions to the terbium activated radioluminescent glasses disclosed above and to some listed in U.S. Pat. No. 3,654,172, result in reduced afterglow and background buildup in these materials under x-ray excitation in the range from 5 keV to 16 MeV. The applicants have found further that by incorporating gadolinium oxide and the appropriate amount of terbium oxide to such glasses the luminescent responsivity can be improved within the same energy regime. The applicants have found further that by combining the addition of appropriate amounts of cerium or europium oxide with the appropriate amounts of gadolinium and terbium oxide that the luminescence responsivity and afterglow characteristics can be improved under x-ray excitation over prior art thus providing a unique high resolution scintillating detection screen that can be used for such applications as x-ray real time radiography.

As previously discussed, an increase in background levels due to increased phosphorescence under continuous x-ray illumination is due to increased trapping/detrapping mechanisms. This effect can be monitored as a function of increasing accumulated dose by simultaneously measuring the glass light output and the accumulated dose to the glass under continuous x-ray illumination.

The samples are x-ray illuminated at a 6 inch target-to-screen distance. The x-ray energy range studied was between 250 kVp and 350 kVp. A photometer is used to detect the resulting luminescence and to monitor the buildup. Corrections are applied for ambient light in the darkened room and background x-ray signals on the photometer. X-ray absorption corrections were also applied to the buildup of each glass. An electronic dosimeter probe is placed next to the sample and the accumulated dose is recorded. Luminescence and dose measurements are taken at 1 minute intervals.

Relative luminescence responsivity measurements were taken in a similar manner to that described above but the x-ray conditions were chosen such that the signal buildup was small. For these measurements, all glasses were preheated to 400° C. to release trapped carriers and to bleach any x-ray induced coloration prevalent in the samples from prior experiments. Glass buttons of approximately equal thickness were measured.

The oxides of cerium and europium can be added into silicate luminescent glasses disclosed in this application and to some disclosed in U.S. Pat. No. 3,654,172 by admixing one of the following: $Ce_2O_3$ ($Ce^{3+}$), $CeO_2$ ($Ce^{4+}$), $Eu_2O_3$ ($Eu^{3+}$), $EuO$ ($Eu^{2+}$) or any other batch component that is transformed during glass formation into the mixed valence metal oxides of roughly equal proportions. It appears likely that both high and low oxidation states are required to interact with the x-ray generated electrons and holes and to transfer this energy to terbium to reduce trapping, background buildup and phosphorescence.

The mixed valence rare earth ions are selectively trapping charge that would normally be trapped at other locations in the glass. The advantage of using cerium or europium ions is that they offer pathways to transfer this energy to the terbium ions. This process is structure independent since the rare earth ions are evenly distributed throughout the glass and the transfer processes are unaffected by glass modifier ions. For example, different or no glass modifier ions have little effect on the interaction between the cerium or europium ions and terbium that results in reduced phosphorescence.

As was previously mentioned, at least one component selected from the group $Ce_2O_3/CeO_2$ and $EuO/Eu_2O_3$ in the range from 0.1 to 2.0 percent by weight can be added to terbium activated luminescent glasses disclosed in this application and some of those claimed in U.S. Pat. No. 3,654,172 for the purpose of reducing signal buildup and afterglow under x-ray illumination in the 5 keV to 16 MeV range. Amounts present below about 0.1 percent have not shown to have any meaningful effect on afterglow. Concentrations higher than 2 percent give rise to a deleterious coloration of the glass evidently due to strong concentration dependent absorption transitions associated with these ions.

$Gd_2O_3$ additions in the range of about 1.0 to about 15 weight percent to terbium activated silicate luminescent glasses disclosed in this application, and to some of those disclosed in U.S. Pat. No. 3,654,172 will allow $Tb_2O_3$ level in an amount of from about 5 to about 20 weight percent and will assure an improved luminescence response in these glasses under x-ray illumination in the 5 keV to 16 MeV range. Compositions containing below 5 wt % $Tb_2O_3$ have shown no improvement inresponsivity over the prior art for any amount of $Gd_2O_3$. Compositions above 20 percent $Tb_2O_3$ undergo severe concentration quenching, resulting in no improvement over prior art. Similar findings are associated with $Gd_2O_3$ concentrations below one percent and above 15 percent.

As discussed in U.S. Pat. No. 3,654,172 the particular choice of host material is influenced by a variety of considerations well-known to those skilled in art as are the processes for making such terbium activated silicate glasses. Minor amounts of various additives such as $Al_2O_3$, $B_2O_3$, $P_2O_5$, $La_2O_3$ and $Y_2O_3$ are known to improve the working and chemical properties and chemical durability of such glasses.

Several examples are given to illustrate the preparation and characteristics of the luminescent glasses of the invention. These examples are to be construed as illustrative only and not limiting in any manner the scope and spirit of the invention as defined by the appended claims.

EXAMPLE 1

Various amounts of cerium oxide were incorporated into the compositions expressed in weight percent on the oxide basis listed in Table 2. $Ce_2O_3$ was substituted for BaO in this case and the small reduction in the latter does not have an effect on the luminescent properties of the glass. The batch constituents may comprise any materials, either the oxides or other compounds, which when melted together, are transformed to the desired composition in the proper portions. The batch components were blended together, placed in either fused silica, platinum, or aluminum oxide crucibles and then melted at 1400°–1500° C. for about 3 hours in air. The melts were poured onto a cool graphite plate to yield circular buttons approximately ⅜" thick. The buttons were transferred immediately to an annealing furnace operated at 850° C.

Although the glasses recorded in Table 2 in this invention were made in accordance with the laboratory procedure outlined above, it will be appreciated that where large quantities of glass are desired these compositions are amenable to conventional glass melting techniques in pots or continuous tanks. Likewise, these glasses can be shaped by commercial glass-forming techniques such as blowing, casting, drawing, pressing, rolling, etc. and can be formed into fiberoptic scintillating faceplates or ground up and applied to mylar supports as in the case of polycrystalline phosphors.

Table 2 demonstrates the effect of addition of cerium oxide on the luminescent properties of the glass. Cerium oxide reduces the afterglow in the glass measured here as percent signal increase during x-ray illumination at 250 kV machine energy. The measurements reported here were taken at the 10,000 R exposure level. Increasing amounts of cerium oxide further reduce this signal buildup. A further observation made with the cerium doped glasses was the reduced phosphorescence after the x-rays were turned off in relation to the cerium free glasses. For example, the phosphorescence is approximately 0.1 percent of peak signal at 0.5 seconds after the x-rays are turned off for sample 2 as opposed to above 5 percent in a commercial cerium free terbium activated glass. This is observed in the drawing.

The relative light output measurements of the glasses in Table 1 were measured immediately after x-rays were turned on, for example, before buildup. Prior to this test, the glasses had been thoroughly heated (450° C.) to release trapped energy and relieve radiation coloration. These measurements are an indication of their relative response prior to radiation damage. Although the cerium glasses have a reduced signal, they offer the substantial advantage of improved signal stability and reduced afterglow.

TABLE 2

| | Weight Percent | | | | |
|---|---|---|---|---|---|
| | 1 | 2 | 3 | 4 | 5 |
| $SiO_2$ | 54.2 | 54.2 | 54.2 | 54.2 | 54.2 |
| BaO | 29.5 | 29.3 | 29.0 | 28.5 | 27.5 |
| $Li_2O$ | 9.1 | 9.1 | 9.1 | 9.1 | 9.1 |
| $Al_2O_3$ | 4.2 | 4.2 | 4.2 | 4.2 | 4.2 |
| $Tb_2O_3$ | 3.0 | 3.0 | 3.0 | 3.0 | 3.0 |
| $Ce_2O_3$ | | 0.2 | 0.5 | 1.0 | 2.0 |
| Relative Light Output | 100 | 97.2 | 95.3 | 91.6 | 89.5 |
| % Signal Inc. Under X-Rays at 10kR | 20 | 5 | 2 | 1 | 0 |

EXAMPLE 2

Table 3 compares the x-ray radiation stabilizing effects of europium oxide on a silicate luminescent glass composition. The compositions in this table were prepared in a similar manner to those in Table 2 except that they were melted at 1540° C. for about 3 hours in a vitreous carbon crucible under a flowing argon atmosphere. The glasses were not poured, but were cooled from the melt in the crucibles while in the furnace to 850° C. where they were held for 3 hours under the same argon atmosphere. The glasses were then cooled by natural cooling after the furnace was shut down to yield glass buttons approximately ⅜" thick.

Table 3 demonstrates that europium oxide additions quench the afterglow measured here as percent signal increase under continuous x-ray illumination at 250 kV machine energy at 3000 R. The glass remains stable to 25,000 R and above. This is a significant result in that europium oxide addition does not diminish the luminescence signal of the glass. The visual phosphorescence after the x-rays are turned off is reduced in the europium-containing glass in comparison to the europium-free glass in a similar manner to that observed with cerium glasses (see Example 1).

TABLE 3

| | Weight Percent | |
|---|---|---|
| | 1 | 2 |
| $SiO_2$ | 56.1 | 55.1 |
| BaO | 12.4 | 12.2 |
| $Cs_2O$ | 12.4 | 12.2 |
| $Al_2O_3$ | 1.5 | 1.5 |
| $Na_2O$ | 2.8 | 2.8 |
| $K_2O$ | 1.3 | 1.3 |
| $La_2O_3$ | 4.5 | 4.4 |
| $EuO/Eu_2O_3$ | | 1.1 |
| $Tb_2O_3$ | 9.0 | 9.0 |
| Relative Light Output | 100 | 100 |
| % Signal Inc. Under X-Rays at 3000 R | 3.1 | 0 |
| At 25000 R | 7.0 | 0 |

EXAMPLE 3

Both compositions in Table 4 were prepared in a similar manner to those compositions in Table 3. Table 4 demonstrates that gadolinium oxide can be added to luminescent glasses to incorporate larger amounts of the luminescent activator $Tb_2O_3$ without the effects of concentration quenching. Composition 1 is similar to one in U.S. Pat. No. 3,654,172 and has a high x-ray induced luminescence. In this invention, the incorporation of gadolinium oxide and the concomitant increase in $Tb_2O_3$ over that claimed in U.S. Pat. No. 3,654,172 result in a signal improvement of 38%. Minor differences in the other oxide components would not be responsible for the signal increase.

TABLE 4

| | Weight Percent | |
|---|---|---|
| | 1 | 2 |
| $SiO_2$ | 55.8 | 55.8 |
| BaO | | 12.3 |
| SrO | 20.8 | |
| $Cs_2O$ | 12.3 | 12.3 |
| $Al_2O_3$ | 1.5 | 1.5 |
| $Na_2O$ | 2.8 | 2.8 |
| $Li_2O$ | 1.3 | |
| $K_2O$ | | 1.3 |
| $Gd_2O_3$ | | 5.0 |
| $Tb_2O_3$ | 5.4 | 9.0 |
| Relative Light Output | 62 | 100 |

EXAMPLE 4

The compositions of Table 5 were prepared in a similar manner to those of Example 2. The afterglow and light output measurements were taken as in Examples 2 and 3 at 250 kV machine energy. Table 5 demonstrates that $Ce_2O_3$ addition reduces afterglow and signal buildup (Compositions 2-6); that $Gd_2O_3$ addition allows for an increase in $Tb_2O_3$ concentration above the ranges claimed in U.S. Pat. No. 3,654,172 with a concomitant increase in luminescent response (Compositions 3-6) over one of the best glasses in that patent (Composition 1), and that compositions that have $Ce_2O_3$, $Gd_2O_3$ and $Tb_2O_3$ additions in the appropriate amounts (Compositions 3-6) have an improved luminescent response, reduced afterglow and improved luminescent stability under x-rays over prior art. Table 5 also demonstrates the effect of concentration quenching. Here, the peak light output is at 10.5 wt % $Tb_2O_3$. (This peak value is not dramatically altered with different concentrations of $Gd_2O_3$. It has been shown in other compositions that the $Gd_2O_3$ concentration can range between 1–15% to obtain similar results.)

TABLE 5

| | Weight Percent | | | | | |
|---|---|---|---|---|---|---|
| | 1 | 2 | 3 | 4 | 5 | 6 |
| $SiO_2$ | 55.8 | 55.0 | 55.0 | 54.3 | 53.2 | 52.3 |
| BaO | | | 12.3 | 11.9 | 11.7 | 11.4 |
| SrO | 20.8 | 20.8 | | | | |
| $Cs_2O$ | 12.3 | 12.3 | 12.3 | 11.9 | 11.7 | 11.3 |
| $Al_2O_3$ | 1.5 | 1.5 | 1.5 | 1.5 | 1.4 | 1.4 |
| $Na_2O$ | 2.8 | 2.8 | 2.8 | 2.8 | 2.7 | 2.6 |
| $Li_2O$ | 1.3 | 1.3 | | | | |
| $K_2O$ | | | 1.2 | 1.3 | 1.3 | 1.3 |
| $Gd_2O_3$ | | | 4.9 | 5.0 | 4.9 | 4.8 |
| $Ce_2O_3$ | | 0.8 | 0.8 | 0.8 | 0.8 | 0.8 |
| $Tb_2O_3$ | 5.4 | 5.4 | 9.0 | 10.5 | 12.3 | 14.2 |
| Relative Light Output | 67 | 63 | 87 | 100 | 94 | 84 |
| % Signal Inc. at 25000 R | 17 | 6 | 0 | 0 | 0 | 0 |

While there has been shown and described what are at present considered the preferred embodiments of the invention, it will be obvious to those skilled in the art that various changes and modifications may be made therein without departing from the scope of the invention as defined by the appended claims.

The new glass compositions listed in Tables 1-5 are not meant for use only for radiography or the detection of x-rays. They can be used for other applications such as particle beam tracking, detection of electron beams in cathode ray tubes or electron microscopes, and in the detection of thermal neutrons, or gamma-rays.

What is claimed is:

1. A luminescent terbium-activated silicate glass exhibiting luminescence responsivity under x-ray radiation in the range of from about 5 keV to about 16 MeV and consisting essentially by weight on the oxide basis, of about 3–25% $R_2O$ wherein $R_2O$ consists of 0–5% $Li_2O$, 0–25% $Na_2O$, 0–25% $K_2O$, 0–25% $Rb_2O$ and 0–25% $Cs_2O$; 5–55% RO wherein RO consists of 0–20% MgO, 0–30% CaO, 0–45% SrO and 0–55% BaO; 35–56.1% $SiO_2$; 0–20% $R_2O_3$ wherein $R_2O_3$ consists of 0–20% $La_2O_3$ and 0–15% $Y_2O_3$; 0.1–2% of at least one oxide selected from the group consisting of cerium oxide and europium oxide; 0.75–20% $Tb_2O_3$ and 1–15% $Gd_2O_3$.

2. A glass in accordance with claim 1 wherein said terbium oxide is present in an amount of about 0.75 to 10 percent.

3. A glass in accordance with claim 2 wherein said terbium oxide is present in an amount of about 0.75 to 7 percent.

4. A glass in accordance with claim 1 wherein said at least one oxide of cerium and europium is present in an amount of about 0.1 to 1.0 percent.

5. A glass in accordance with claim 1 wherein said gadolinium oxide is present in an amount of about 1 to 10 percent.

6. A glass in accordance with claim 1 wherein said terbium oxide is present in an amount of about 6 to 12 percent.

7. A glass in accordance with claim 1 wherein said terbium oxide is present in an amount of about 5 to 20 percent.

* * * * *